United States Patent [19]

Tolino

[11] Patent Number: 5,309,626
[45] Date of Patent: May 10, 1994

[54] REACTOR VESSEL HEAD O-RING INSTALLATION TOOL

[75] Inventor: Ralph W. Tolino, Wilkinsburg, Pa.

[73] Assignee: Westinghouse Electric Corp., Pittsburgh, Pa.

[21] Appl. No.: 968,742

[22] Filed: Oct. 30, 1992

[51] Int. Cl.$^5$ ............................................. B23P 19/00
[52] U.S. Cl. ................................. 29/723; 29/281.1; 29/281.4; 376/463
[58] Field of Search .................. 29/723, 281.1, 281.4; 376/205, 463; 248/206.5, 207, 309.2, 327

[56] References Cited

U.S. PATENT DOCUMENTS

| | | | |
|---|---|---|---|
| 417,997 | 12/1889 | Dupuis | 248/207 |
| 1,465,659 | 8/1923 | Wheeler | 248/207 |
| 3,698,724 | 10/1972 | Blachere et al. | |
| 3,792,822 | 2/1974 | Underhill | 248/309.2 |
| 3,851,906 | 12/1974 | Erliing Frisch | |
| 3,872,565 | 3/1975 | Ritz et al. | 29/723 |
| 3,929,253 | 12/1975 | Johnsson | |
| 4,305,557 | 12/1981 | Kowalski | 248/327 |
| 4,830,321 | 5/1989 | Irie | 248/206.5 |
| 4,938,440 | 7/1990 | Weinfield | 248/206.5 |
| 4,980,117 | 12/1990 | Blaushild | |

*Primary Examiner*—Timothy V. Eley
*Assistant Examiner*—David P. Bryant

[57] ABSTRACT

A tool for use in installing O-ring seals in the removable head of a nuclear reactor pressure vessel. Disclosed are two embodiments of the tool. One embodiment is adapted to fit within the stud bolt holes of the flange of the removable head of the pressure vessel. The other embodiment is adapted to be magnetically attached to the underside of the flange of the removable head of the pressure vessel. The tool uses a movable support arm to properly position and support the O-rings in their respective grooves machined in the underside of the flange of the removable head.

16 Claims, 3 Drawing Sheets

REACTOR VESSEL HEAD O-RING INSTALLATION TOOL

BACKGROUND OF THE INVENTION

This invention relates to nuclear reactor pressure vessels and more particularly to a tool used to install O-ring seals in the removable head of a reactor pressure vessel.

In a typical nuclear reactor system that uses pressurized water as a coolant, the reactor vessel includes a removable upper steel head. The steel head when removed, provides access to the interior of the reactor vessel for purposes of refueling the reactor core, as well as any other required maintenance purposes. The removable head is secured to the body of the reactor vessel by a plurality of stud bolts and nuts installed around the circumference of a flange around the base of the removable head and a cooperating reactor vessel body flange. Since the reactor vessel is filled with pressurized water as a coolant during operation, it is necessary to provide a watertight, leakproof seal between the cooperating surfaces of the removable head flange and the reactor vessel body flange.

The seal typically includes a pair of hollow, metallic O-rings as gaskets placed within a pair of concentric circular grooves machined in the bottom flange surface of the removable head. These O-rings are circular metal tubes which resist the internal pressure of the coolant in cooperation with the bolted joints between the removable head flange and the reactor vessel body flange. The outside diameter of the O-rings is made slightly larger than the depth of the grooves machined in the bottom flange surface of the removable head. In this arrangement, when the removable head flange is bolted to the reactor vessel body flange, the O-rings are slightly flattened within their respective grooves by the smooth, flat surface of the reactor vessel body flange. The O-rings are also self-energized by permitting the internal pressure in the vessel to act on the inside of the metal O-rings through a series of slots formed in the O-ring. The double O-ring and bolted flange design of the reactor vessel have proven to be very effective in preventing any leakage of the pressurized coolant from the vessel during its operation.

The O-rings have been generally secured within the circular grooves machined in the bottom flange of the removable head by special clips. U.S. Pat. No. 4,980,117 to Ronald M. Blaushild discloses one type of clip used to secure the O-rings in place. As discussed in U.S. Pat. No. 4,980,117, the O-rings are replaced each time the vessel is opened for refueling or other maintenance purposes. When the vessel is opened and the removable head raised, the underside surfaces of the removable head defines an irradiated environment that could be hazardous to the maintenance personnel. To protect these maintenance personnel, it is desirable that the O-ring seals be replaced quickly and easily with a minimum exposure time to the irradiated undersurface of the removable head. In the past, replacement of the O-rings has required a number of maintenance personnel to properly support and position the O-rings while the retaining clips are installed and thereby increasing the risk of exposure to the irradiated environment under the head as well as the risk of working under suspended heavy steel structure.

SUMMARY OF THE INVENTION

It is therefore an object of this invention to provide a tool to facilitate the installation of O-ring seals in the flange of the removable head of a nuclear reactor pressure vessel.

It is further object of this invention to provide a tool to facilitate the installation of O-ring seals in the flange of the removable head of a nuclear reactor pressure vessel that greatly reduces the exposure of maintenance personnel to the irradiated environment associated with such a vessel when the head is removed.

It is still further object of this invention to provide a tool for the installation of O-ring seals that permits a safe and easy installation of the seal without the risk of any damage to the integrity of the seal.

These and other objects of this invention will become apparent from the accompanying specification, drawings and claims.

It has been discovered that the foregoing objects can be attained by a tool that supports and positions one or more O-rings adjacent to one or more circular grooves in a nuclear reactor pressure vessel head flange, which tool is comprised of an attachment portion adapted to be secured to the removable head flange and a support arm which projects from the attachment portion and is adapted to support one or more O-rings in a predetermined position prior to the O-rings being secured in their respective grooves by clips or similar fastening devices.

DESCRIPTION OF THE PREFERRED EMBODIMENTS

Figure 1:
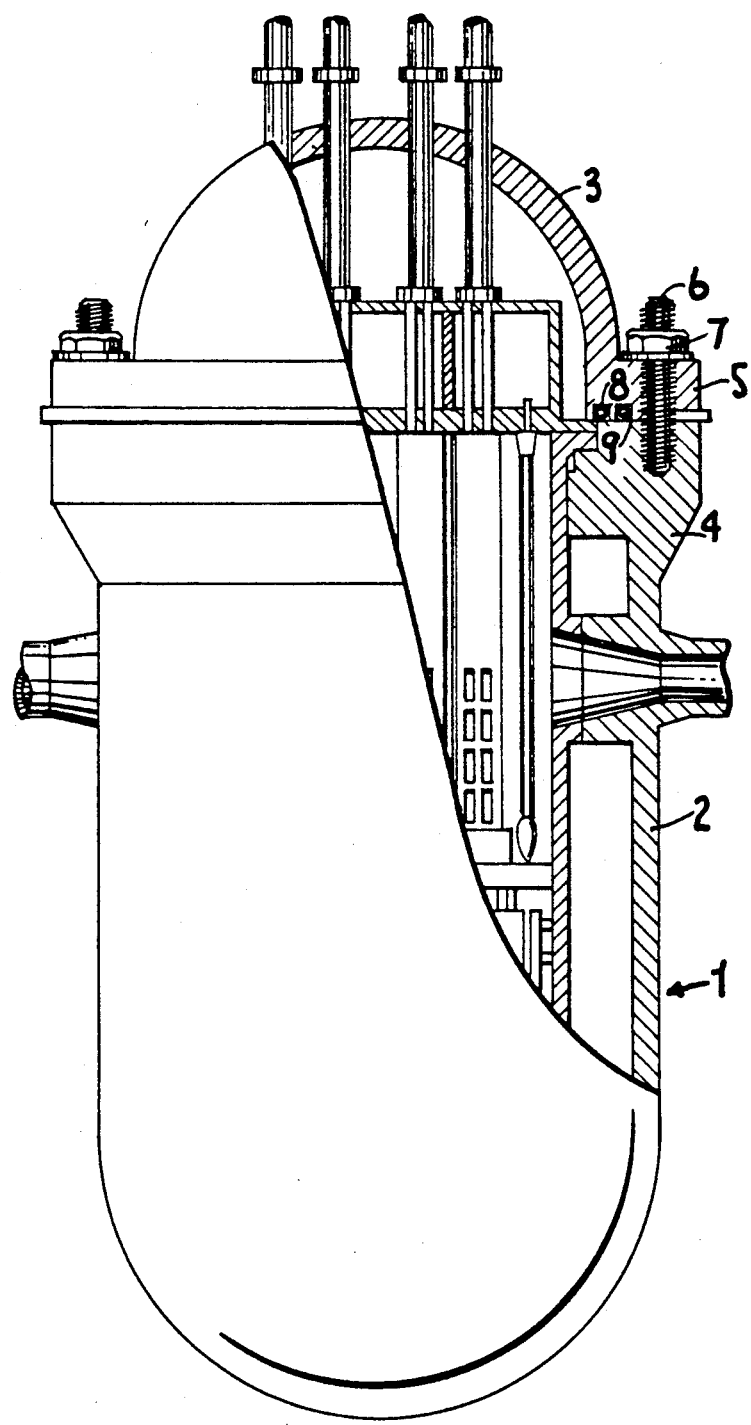
FIG. 1 is an elevational view, partly in section, of a nuclear reactor vessel which uses the tool of this invention.

In FIG. 1, there is shown an example of pressurized nuclear reactor 1 for which the tool of this invention has been developed. The reactor vessel 1 has a heavy steel body 2 which is closed by a heavy steel domed removable head 3. A flange 4 on the body 2 of the reactor vessel 1 cooperates with a flange 5 on the removable head 3 and is tightly secured thereto by means of stud bolts 6 and nuts 7. On the lower surface of the flange 5 of the removable head there are machined two annular grooves 8 which accommodate O-ring seals 9 which act as gaskets to provide a watertight and leakproof seal when the removable head 3 is secured to the body 2 of the nuclear reactor vessel 1.

The O-rings 9 are usually circular, metal tubes which have been plated with silver to provide a smooth outer surface. Typically, two of the O-rings 9 are used to form the watertight, leakproof seal in the nuclear reactor 1. The outside diameter of the O-rings 9 is made slightly larger than the depth of the annular grooves in the underside of the flange 5 of the removable head so that when the head 3 is bolted onto the flange 4 of the vessel body 2, the O-rings 9 will be slightly deformed and produce a tight, pressure resistant seal. Additionally, the pressure within the nuclear reactor 1 acts on the O-rings 9 through slots (not shown) in the O-rings 9 to further seal the connection between the removable head 3 and the body 2. The O-rings 9 are secured in the grooves 8 before the removable head 3 is bolted tightly to the body 2 by clips (not shown) which are described in detail in U.S. Pat. No. 4,980,117 issued to Ronald M. Blaushild.

Figure 2:
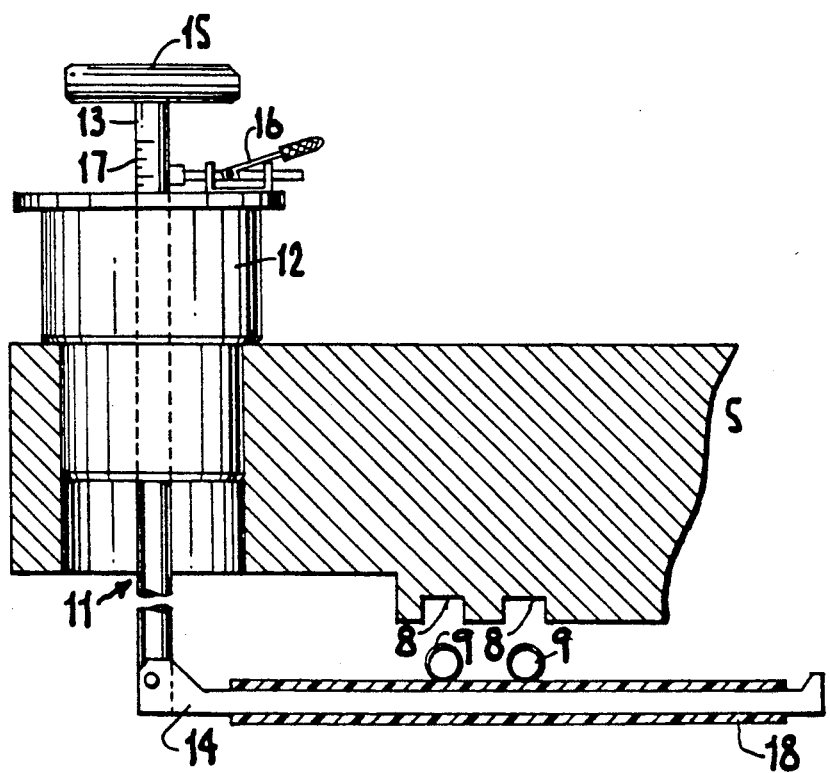
FIG. 2 is an elevational view, partly in section, of one embodiment of the tool of this invention.

FIG. 2 illustrates one embodiment of the tool of this invention. In this embodiment, the tool 11 is comprised of an attachment portion 12, an axially and radially movable rod 13 and a support arm 14 which is hingedly attached to the bottom of the rod 13. The rod 13 fits snugly in a hole in the center of the cylindrical attachment portion 12 and is provided with a handle 15 at the top. The attachment portion 12 in this embodiment comprises a cylinder or several stacked cylinders made of a smooth, easily shaped plastic, such as "Delrin", and is designed to fit snugly in the stud bolt holes formed in the flange 5 of the removable head 3 as shown in FIG. 2. The cylinders may be of several diameters to allow the tool of this invention to be used on removable heads 3 that have different sized stud bolts 6 and holes therefor in the flange 5 of the removable head 3. If desired, the attachment portion 12 is provided with toggle or cam type of locking device 16 which engages the rod 13 and will lock it into place in any desired position. If desired, the rod 13 can also be calibrated with markings 17, as shown in FIG. 2.

The support arm 14 of this embodiment is hingedly attached to the bottom of the rod 13 to allow the support arm 14 to be folded up alongside of the rod 13 thereby allowing it to be inserted into the stud bolt hole in the flange 5 of the removable head 3 and then folded down to a horizontal position as shown in FIG. 2 when the attachment portion 12 of the tool 11 is snugly secured in the stud bolt hole. The support arm 14 is preferably provided with a roller sleeve 18 of a smooth plastic, such as "Delrin".

In order to install the O-rings 9 in the grooves 8 in the flange 5 of the removable head 3, a tool 11 is installed in a number of the stud bolt holes in the flange 5 of the removable head 3 and the rod 13 of each tool 11 is pushed down to unhinge the support arm 14 into a horizontal position as shown in FIG. 2. The new O-rings 9 are then placed on the support arms 14 beneath the grooves 8 as shown in FIG. 2. The rods 13 are then raised simultaneously or one at a time by a worker or workers positioned safely on top of the removable head 3 until the O-rings 9 are inserted into the grooves 8. The locking device 16 allows the rod 13 to be locked in any desired axial or radial position. A single worker then, with suitable radiation protection, is able to quickly and easily insert the retainer clips into the O-rings 9 to hold them secured in the grooves 8. The roller sleeve 18 allows the worker to easily rotate the O-ring 9, if necessary to easily insert the retainer clips into the O-ring 9.

Figure 3:
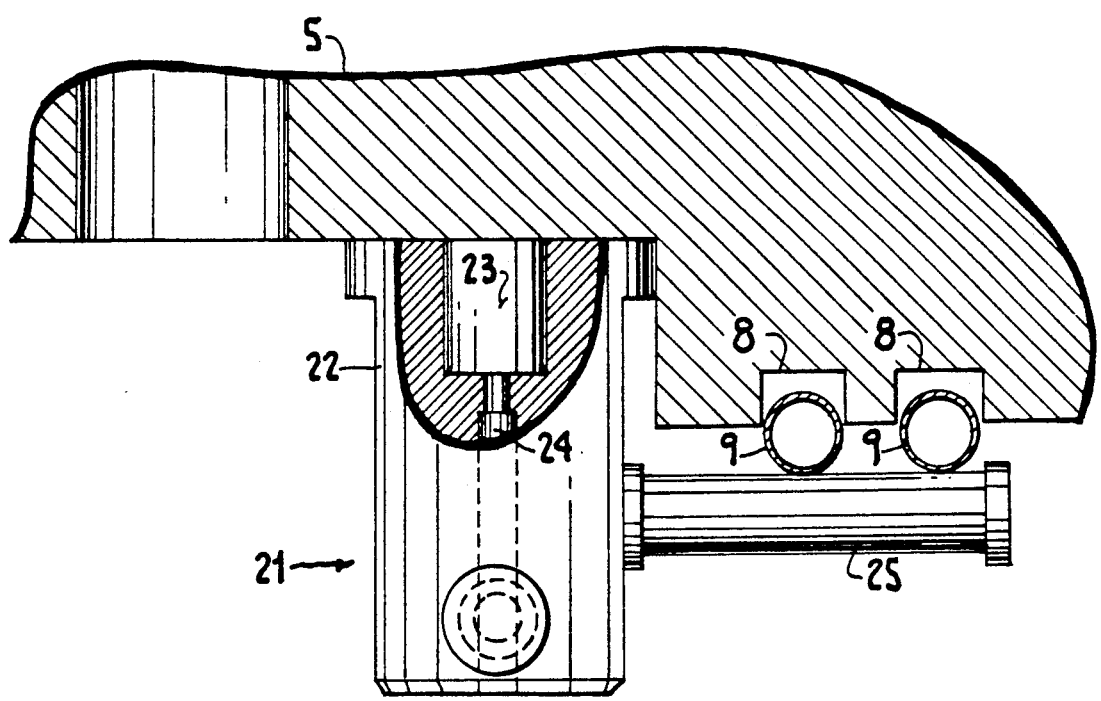
FIG. 3 is an elevational view, partly in section, of another embodiment of the tool of this invention.

Another embodiment of the tool of this invention is shown in FIG. 3. In this embodiment, the tool 21 has an attachment portion 22 comprised of a rotatable body, preferably made of a smooth plastic, such as "Delrin" and containing a strong permanent magnet 23 secured to the body of the attachment portion 22 by a stud or screw 24. The support arm 25 is also attached to the body of the attachment portion 22 by a threaded end or other suitable fastener in a horizontal position as shown in FIG. 3. If desired, the body of the attachment portion 22 can be provided with several points for attaching the support arm 25 at the desired elevation.

The tool 21 of this embodiment is used by placing a plurality of the tools 21 around the bottom surface of the removable head flange 5 with the support arms 25 rotated tangentially to the grooves 8. The attachment portion is held tightly to the steel flange 5 by the magnet 23. The O-rings 9 are then placed, one at a time, into the proper groove 8 and then the body of the attachment portion 22 is rotated 90 degrees allowing the support arm 25 to hold the O-ring 9 in the groove 8. A single worker, with suitable radiation protection, is then able to insert the retainer clips into the O-ring 9 to hold them permanently in the groove. The support arms 25 are then rotated back out of the way and the procedure repeated for the second O-ring 9.

It will be appreciated by those responsible for the refueling and maintenance of nuclear reactors that the tool of this invention, while simple to manufacture and use, is very effective in reducing the amount of time a worker is exposed to radiation hazards as well as greatly reducing the number of workers required to install the O-rings. It will also be appreciated that the tool of this invention can easily be adapted to nuclear reactors of different designs and sizes with little difficulty. Therefore, while I have described and illustrated two embodiments of the tool of this invention, it is understood that this tool can be adapted to a number of different situations without departing from the scope of this invention.

I claim:

1. A tool for supporting a large diameter metal O-ring immediately beneath a circular groove in the underside of a nuclear reactor head flange to facilitate the installation of the O-ring into the circular groove, comprising an attachment portion secured to said flange and a cantilever support arm projecting horizontally away from said attachment portion and extending underneath said circular groove for supporting said O-ring immediately beneath said circular groove.

2. The tool of claim 1 in which said attachment portion is a cylinder adapted to fit within a stud hole in said head flange.

3. The tool of claim 2 in which the cylinder is made of plastic.

4. The tool of claim 1 in which said attachment portion comprises a plurality of cylinders of different diameters.

5. The tool of claim 1 in which the attachment portion contains an axially and radially, movable rod.

6. The tool of claim 5 in which the rod has a handle.

7. The tool of claim 5 in which the support arm is hingedly secured to said rod.

8. The tool of claim 5 in which the rod is equipped with means to lock it in a predetermined position.

9. The tool of claim 5 in which the rod is calibrated.

10. The tool of claim 1 in which the support arm is provided with a roller.

11. The tool of claim 10 in which the roller is made of plastic.

12. The tool of claim 1 in which the attachment portion contains a magnet.

13. The tool of claim 12 in which the magnet is contained within a rotatable plastic body.

14. The tool of claim 12 in which the support arm is made of plastic.

15. The tool of claim 12 in which the support arm is screw connected to the attachment portion.

16. The tool of claim 12 in which the support arm is adapted to be attached at different positions on the attachment portion.

* * * * *